W. F. THOMAS.
INTERNAL COMBUSTION ENGINE.
APPLICATION FILED DEC. 12, 1911.

1,201,532.

Patented Oct. 17, 1916.
4 SHEETS—SHEET 1.

W. F. THOMAS.
INTERNAL COMBUSTION ENGINE.
APPLICATION FILED DEC. 12, 1911.

1,201,532.

Patented Oct. 17, 1916.
4 SHEETS—SHEET 3.

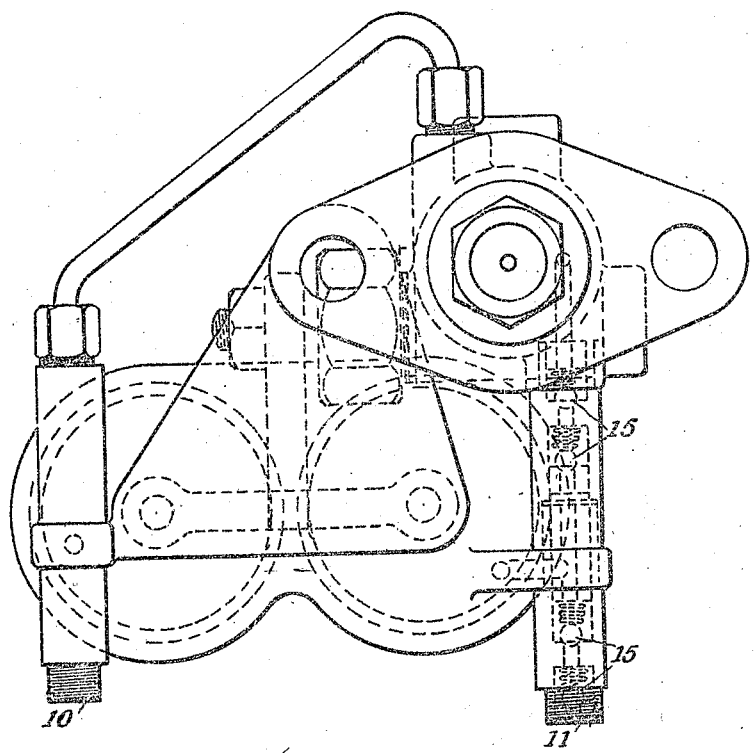

UNITED STATES PATENT OFFICE.

WALTER FREDERICK THOMAS, OF ST. HELENS, ISLE OF WIGHT, ENGLAND.

INTERNAL-COMBUSTION ENGINE.

1,201,532. Specification of Letters Patent. Patented Oct. 17, 1916.

Application filed December 12, 1911. Serial No. 665,316.

*To all whom it may concern:*

Be it known that I, WALTER FREDERICK THOMAS, residing at Alma Cottage, St. Helens, Isle of Wight, Hampshire, England, Great Britain, have invented a certain new and useful Improvement in Internal-Combustion Engines; and I do hereby declare the following to be a full, clear, and exact description of the invention, such as will enable others skilled in the art to which it appertains to make and use the same.

My invention relates to improvements in internal combustion engines, particularly to that class of engines, in which the cylinder has a reduced extension and a stepped piston slidably mounted therein.

It is the object of the invention, to provide a stepped piston which is adapted to be used for the purpose of starting and reversing, or as an air compressor for supplying the reservoir with fresh air. With this end in view, the cylinder is provided with ports to admit air into the reduced portion of the cylinder and below the piston, while the piston has ports formed therein which serve to admit air above the piston. The way and manner in which these several features are effected will be readily understood by means of the following description, reference being had to the accompanying drawings in which:—

Figure 1:
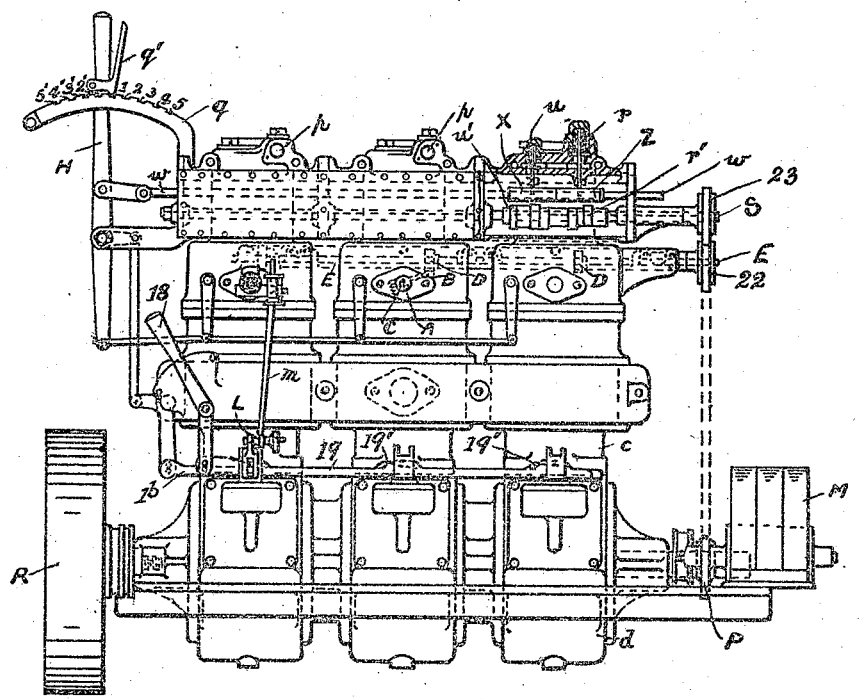
Figure 2:
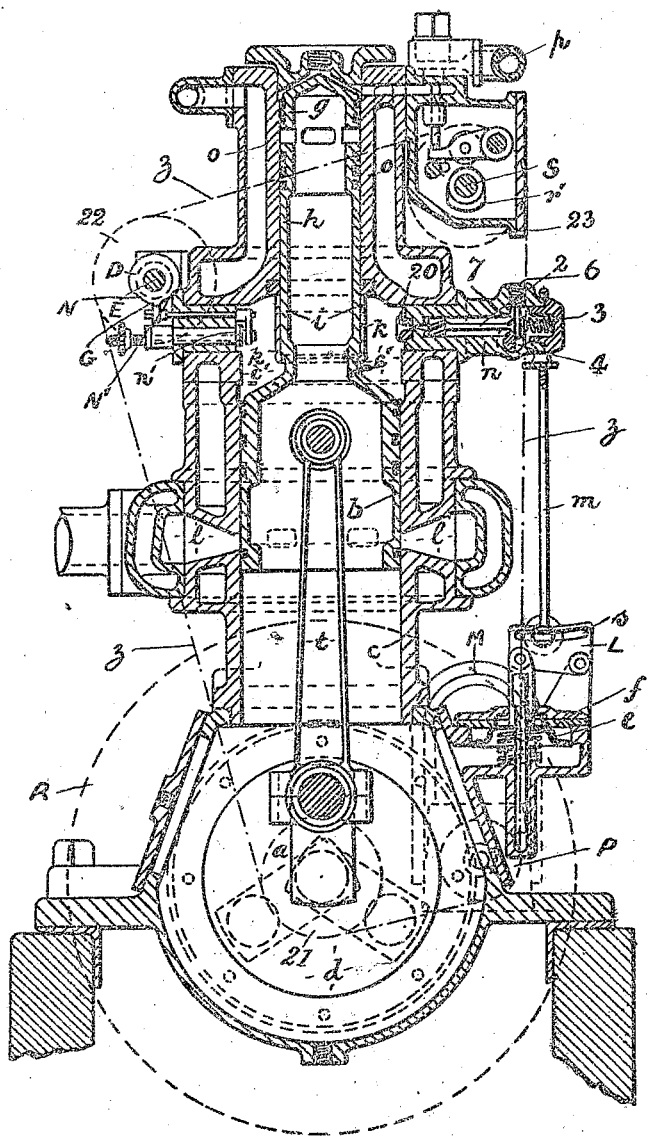
Figure 3:
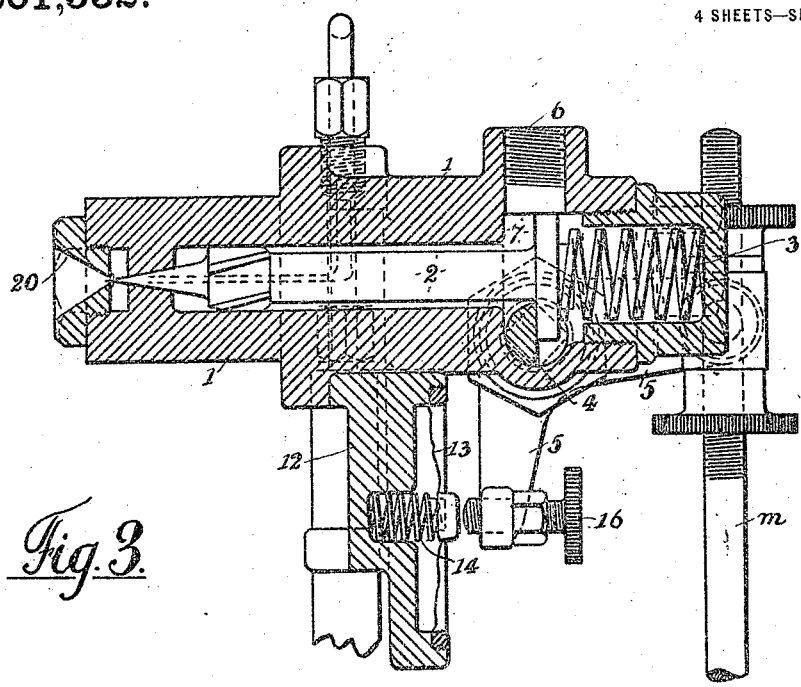
Figure 5:
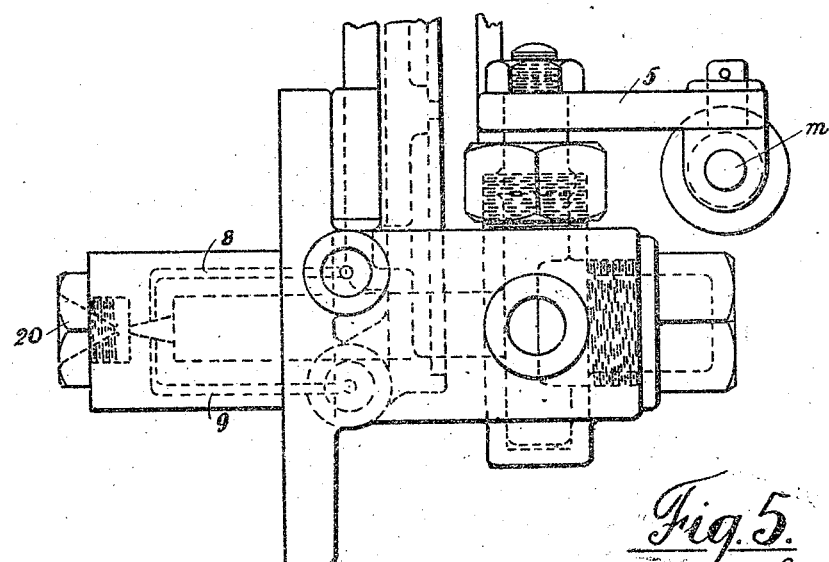

Figure 1 shows a part sectional elevation of a three cylinder engine fitted with my improvements. Fig. 2 shows a section taken through one of the cylinders to larger scale. Figs. 3, 4, and 5, show to enlarged scale detail view of the fuel sprayer with air supply and fuel pumps.

When the crank shaft ($a$) see Fig. 2, revolves in either direction the up or in stroke of the piston ($b$) in the cylinder ($c$) causes a partial vacuum to be formed in the crank chamber ($d$); the atmospheric pressure then causes the spring loaded piston valve ($e$) to open and let in a quantity of air; the following down or out stroke of the piston ($b$) compresses the contained air to a slight pressure above the atmospheric, closing the piston valve ($e$) tight against the seat ($f$). On the piston reaching the bottom of its down stroke the ports ($g$) in the extended piston ($h$) correspond with similar ports ($i$) in the sleeve ($k$) thereby letting the slightly compressed air into the working cylinder ($c$).

It will be noticed that the under side of the piston ($b$) is of greater area than the top or working side by the area of the extended piston ($h$). Therefore a greater quantity of air is drawn into the crank chamber ($d$) than is required to completely fill the angular working cylinder ($c$). This extra quantity of air rushes out to the atmosphere through the exhaust ports ($l$) which are also opened when the piston ($b$) is nearing the bottom of its stroke, that is, just before the air ports ($g$) correspond with the ports ($i$). The return or up stroke of the piston first closes the air ports ($g$) and ($i$) also the exhaust ports ($l$) and then compresses the contained air to several atmospheres pressure in the upper part of the working cylinder ($c$). This angular space ($c'$) above the piston is the combustion chamber. During this up stroke of the piston ($b$) the valve ($e$) is opened to let air into the crank chamber ($d$) as before stated. This movement is communicated through the rod ($m$) to open the needle valve (2) in the fuel sprayer ($n$) to be hereinafter described. The fuel is thus forced in a fine cloud spray into the air contained in the working cylinder ($c$) during the compression or up stroke of the piston ($b$), or any part of compression stroke by mechanical means. When the piston has reached the top of its stroke the air is compressed to its highest pressure, and is mixed with a required quantity of sprayed and vaporized fuel, which may be petrol, paraffin, or any other liquid or gaseous hydrocarbon; at this moment the combustible mixture is ignited by an electric spark in the well known manner as at ($n'$), or by a hot tube or hot ball. This so far describes a special form of two cycle internal combustion motor.

The fuel sprayer Figs. 3, 4 and 5 referred to as ($n$) in Fig. 2, consists of a body ($l$), a needle valve (2), which can be opened against the pressure of a spring (3) at the correct time by the cam (4). This cam is actuated by lever (5) and connecting rod ($m$) from the motion of the crank chamber air valve ($e$) see Fig. 2. Compressed air is supplied from a suitable reservoir (not shown) through a pipe (6) to the chamber (7) and fuel under pressure through pipes (10) and (11) to the channels (8) and (9) see Fig. 5, the quantity of fuel being regulated by screw needle valves (not shown). These two channels (8) and (9) are shown to supply two kinds of fuel, if necessary, one light and easily vaporized for starting and heating up the combustion chamber, and the other heavier and cheaper for continuous working. The fuel may be forced either by compressed air on the surface of the liquid in the containing tanks, or by means of pumps, and said pumps may be of the reciprocating plunger type, or a flattened bent tube similar to those used in pressure gages, the bend being opened and closed by suitable mechanism, or a diaphragm ended cylinder (12) as shown in the drawings. Whichever type of pump is employed, double suction and delivery valves are required. A section of such a pump is shown in Fig. 3. The cylinder (12) has one end closed by a diaphragm (13) which is kept out by a spring (14). This cylinder is connected by a pipe containing two ball valves (15) to the fuel storage tank, and also by a pipe containing two ball valves to the channels (8) or (9) in the body of fuel sprayer. The diaphragm is moved against the spring (14) by an extension of the lever (5) causing a delivery of the fuel into the channels (8) or (9) and on the spring (14) returning the diaphragm (13) suction of fuel from the tank is caused to refill the pump cylinder. The amount of movement given to the diaphragm can be regulated by the setscrew (16) in the extended portion of the lever (5).

It will be seen that the fuel and compressed air come together at the point of the needle valve (2) and when same is opened the two enter the working cylinder at high velocity breaking up against the sharp edge of the special steel nozzle (20). The relation between the air in the combustion chamber and fuel is adjusted by moving the bottom of rod (m) in the curved slot (s) on lever (L).

It will be observed that the motor can be made to revolve in either direction, that is, right hand or left hand; again it may be started in either direction, or while running in one direction can be reversed to run in the other direction at the will of the driver, by a movement of the hand lever (H) through mechanism as follows:—The extended piston (h) reciprocates in the air cylinder (c). Compressed air from a reservoir is supplied through pipe (p) and valve (r) which is lifted at the proper time by a cam (r') on the revolving shaft (S). The air presses upon the top of piston (h) causing it to move and set in motion the crank shaft (a) through the connecting rod (t). When the piston reaches the end of its stroke the supply valve is closed and exhaust valve (u) is opened by another cam (u') allowing the air to escape to the atmosphere, while the momentum of the fly wheel (R) causes the piston to return, or in the case of a multicylindered motor, the other cylinders are on working strokes. It will be seen that if the crank is over the top center, one side or other, the compressed air causes the shaft to revolve either right hand or left. The shaft (S) to which is fixed a number of cams (r') (u') is made to rotate through suitable gearing in time with the main crank shaft (a) and so by levers (X) and (Z) move the air supply and exhaust valves (r) and (u) at the required time. By hinging the levers (X) and (Z) on a sliding shaft (w) and this made to slide to and fro by hand lever (H) the valves (r) and (u) can be made to move as desired by allowing the levers (X) and (Z) to be acted upon by different cams. It is so arranged that when the hand lever (H) is kept in mid position on the quadrant (q) by a spring pawl (q') in a notch (l) the motor is still, there being no valves open. When the hand lever is moved to notch (2) the air supply valve (r) is opened to whichever cylinder is over the proper side of top center to make the crank shaft revolve in a right hand direction; the motor is now working on compressed air, the working air supply valve (e) to crank chamber and fuel sprayer being kept closed by locking bar ($l^b$). When the hand lever is moved to notch (3) the locking bar ($l^b$) is moved and the working air valve (e) and fuel sprayer are free to operate, and the motor runs on fuel and compressed air together. The hand lever is then moved to notch (4), the compressed air supply is cut off by the valve (r) being kept on its seat, and the valve (u) kept off its seat to allow the cylinder (c) to be freely open to the atmosphere. When the hand lever is again moved to notch (5) the cylinder (c) with its piston (h) becomes an air compressor; the exhaust valve (u) being the air suction valve and the air supply valve (r) being the delivery valve to the reservoirs, the pipe (p) becoming the air delivery pipe. The compressed air used for starting can thus be made up again to the required pressure. Again if the hand lever (H) be moved the opposite direction from the middle notch (1) to the notches (2'), (3'), (4'), and (5') the motor revolves in a left hand direction and air can be compressed in the reservoirs if required when going astern. Arrangement is also made by extending the hand lever (H) to automatically open compression relief cocks on each combustion chamber when hand lever is in mid positions (1), (2) or (2') on the quadrant to facilitate the starting ahead or astern, or reversing while in motion. This system of starting and reversing can be used for four cycle engines as well as two cycle as described. When ignition of the combustible mixture in working cylinder is effected by an electric spark, it is necessary that the spark should be timed to take place just before the compression stroke finishes, whether the motor be revolving in the right hand or left hand direction, and when a magneto machine is used to generate the electricity, special arrangements are required for reversing direction of revolution.

Having thus described my invention, what I claim as new and desire to secure by Letters Patent is:—

In an internal combustion engine, the combination with a cylinder having a reduced extension at its head end, of a unitary stepped piston slidably mounted therein, said cylinder provided with ports to admit air into the reduced portion of said cylinder and also below said piston, said stepped piston having ports formed therein serving to admit air above said main piston, a fuel inlet for said main piston, and means co-acting with said air inlet below said piston to open said fuel inlet when said air inlet is actuated, substantially as described.

In testimony whereof I affix my signature in presence of two witnesses.

WALTER FREDERICK THOMAS.

Witnesses:
RICHARD COBDEN ROGERS,
GEO. J. B. FRANKLIN.